US012146616B2

(12) United States Patent
Parisi

(10) Patent No.: US 12,146,616 B2
(45) Date of Patent: Nov. 19, 2024

(54) SAFETY APPARATUS FOR THE MOVEMENT OF A PLURALITY OF PNEUMATICALLY INTERCONNECTED GAS BOTTLES UNDER PRESSURE

(71) Applicant: Fulvio Parisi, Monta (IT)

(72) Inventor: Fulvio Parisi, Monta (IT)

( * ) Notice: Subject to any disclaimer, the term of this patent is extended or adjusted under 35 U.S.C. 154(b) by 110 days.

(21) Appl. No.: 17/916,571

(22) PCT Filed: Apr. 6, 2021

(86) PCT No.: PCT/IB2021/052854
§ 371 (c)(1),
(2) Date: Oct. 1, 2022

(87) PCT Pub. No.: WO2021/199014
PCT Pub. Date: Oct. 7, 2021

(65) Prior Publication Data

US 2023/0151931 A1 May 18, 2023

(30) Foreign Application Priority Data

Apr. 3, 2020 (IT) ........................ 102020000007096

(51) Int. Cl.
*F17C 13/08* (2006.01)

(52) U.S. Cl.
CPC .... *F17C 13/084* (2013.01); *F17C 2201/0104* (2013.01); *F17C 2201/032* (2013.01);
(Continued)

(58) Field of Classification Search
CPC .............. F17C 13/084; F17C 2201/032; F17C 2201/056; F17C 2201/0104;
(Continued)

(56) References Cited

U.S. PATENT DOCUMENTS 3,602,368 A * 8/1971 Gould .................... F17C 13/084 211/85.18
4,481,972 A * 11/1984 Stavlo ........................ B66C 1/62 137/376

(Continued)

FOREIGN PATENT DOCUMENTS

DE 102015004738 A1 * 10/2016 ............ F17C 13/084
EP 2639490 A2 9/2013

(Continued)

*Primary Examiner* — Patrick D Hawn

(57) ABSTRACT

Safety apparatus (20) for the movement of a plurality of pneumatically interconnected gas bottles (B') under pressure, the so-called “bottle pack”, comprising:—an internal support structure (21), comprising a plurality of horizontal plates, superimposed vertically, respectively at different levels with respect to the ground, and stably connected to each other,—wherein said support structure (21) supports said plurality of bottles (B'), which contain a pressurised gas and are arranged in juxtaposition to each other on vertical axes, or on horizontal axes and are arranged in juxtaposition to each other on vertical axes, or on horizontal axes,—wherein each bottle (B') in said plurality of bottles comprises respective pneumatic valve means to intercept the flow of gas,—wherein a first plate (P21), lower and close to the ground, is configured as a support pallet for said plurality of bottles (B) and is raised above the ground by means of the support feet (P211),—wherein said pneumatic valve means of each bottle (B') of said plurality of bottles are pneumatically connected by means of a sealed pneumatic circuit connecting the pneumatic valve means of all the bottles (B'), to each other and to a pneumatic connector provided for removable connection of a flexible hose, which creates the pneumatic and mechanical connection with respect to an external appliance that uses the gas, respectively carries out filling with gas, of the bottles of said plurality of bottles (Continued)

(B');—wherein said pneumatic connector of said pneumatic circuit is arranged at a higher level than that of said first plate (P21),—wherein at least said first plate (P21) forms with at least one pair of said support feet (P211) and with the ground at least one slot, having a height sufficient to allow passage of the forks of a fork lift truck for movement of the apparatus (20);—an external cage structure (22), including a plurality of vertical uprights (22.11), arranged around said horizontal plates of said support structure (21) and rigidly connected with respect to said support structure (21). According to the invention, said apparatus (20) comprises:—a vertical interspace (1'), provided between said internal support structure (21) and said external cage structure (22);—screening means (23), vertically mobile within said interspace (I') and configured like a blind, that:—in a first lowered working position, close said at least one slot between said first plate (P21), said at least one pair of support feet (P211) and the ground, while it does not screen from the outside said connector of said pneumatic connection circuit and it is possible for an operator to make the removable connection between said pneumatic connector and said hose, and—in a second raised working position, screens from the outside said pneumatic connector of said pneumatic connection circuit and prevents an operator from making the removable connection between said pneumatic connector and said hose, while it does not close said at least one slot and it is possible to move the apparatus (20) using a fork lift truck, the forks of which are inserted through said at least one slot,—and transfer command means (24), configured to selectively control the vertical movement of said mobile screening means (23), respectively into said first lowered working position and into said second raised working position.

11 Claims, 11 Drawing Sheets

(52) U.S. Cl.
CPC ................. *F17C 2205/0107* (2013.01); *F17C 2205/0142* (2013.01); *F17C 2205/0157* (2013.01); *F17C 2270/0134* (2013.01)

(58) Field of Classification Search
CPC ...... F17C 2205/0142; F17C 2205/0107; F17C 2205/0157; F17C 2223/0123; F17C 2270/0134
See application file for complete search history.

(56) References Cited

U.S. PATENT DOCUMENTS

| | | | | | |
|---|---|---|---|---|---|
| 4,564,109 | A * | 1/1986 | Stavlo | B65D 19/44 | 294/67.1 |
| 5,078,415 | A * | 1/1992 | Goral | F17C 13/085 | 414/537 |
| 5,176,265 | A * | 1/1993 | Bennett | A47F 7/28 | 137/376 |
| 6,343,627 | B1 * | 2/2002 | Hasaka | F17C 5/06 | 141/18 |
| 7,017,741 | B1 * | 3/2006 | Williamson | F17C 13/084 | 206/386 |
| 8,016,300 | B2 * | 9/2011 | Cramer | B65G 7/04 | 137/899.3 |
| 9,285,262 | B2 * | 3/2016 | Kneubuehl | G01G 15/006 | |
| 9,752,726 | B2 * | 9/2017 | Frenal | F17C 13/084 | |
| 9,759,384 | B2 * | 9/2017 | Frenal | F17C 13/084 | |
| 9,988,259 | B2 * | 6/2018 | Stumpf | B67D 7/78 | |
| D827,764 | S * | 9/2018 | Mangeot-Gehin | D23/205 | |
| 10,458,599 | B2 * | 10/2019 | Baune | F17C 13/084 | |
| 10,677,391 | B2 * | 6/2020 | De Potter | G08B 21/18 | |
| 2014/0026991 | A1 * | 1/2014 | Verghade | F17D 1/04 | 137/561 A |
| 2018/0017215 | A1 | 1/2018 | De Potter et al. | | |

FOREIGN PATENT DOCUMENTS

| | | | | |
|---|---|---|---|---|
| EP | 2682667 A2 | 1/2014 | | |
| FR | 2762299 A1 * | 10/1998 | F17C 13/084 | |
| FR | 3010768 A1 * | 3/2015 | F17C 13/084 | |
| GB | 2561808 A | 10/2018 | | |

* cited by examiner

FIG. 6
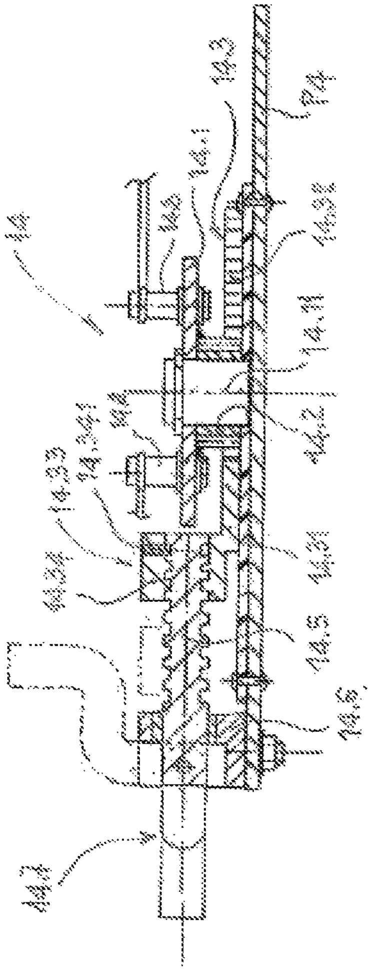
FIG. 7
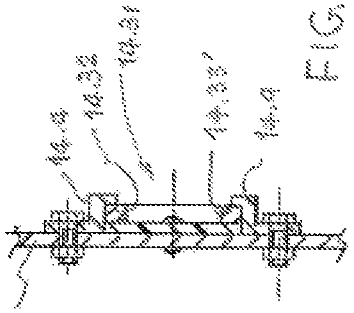
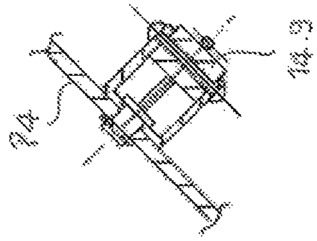
FIG. 8

SAFETY APPARATUS FOR THE MOVEMENT OF A PLURALITY OF PNEUMATICALLY INTERCONNECTED GAS BOTTLES UNDER PRESSURE

This is the national stage of International Application PCT/IB2021/052854, filed Apr. 6, 2021.

The present invention relates to a safety apparatus for the movement of a plurality of pneumatically interconnected gas bottles under pressure, the so-called “bottle pack”.

A bottle is a transportable container of a gas maintained under a pressure greater than atmospheric pressure. The bottle is provided with pneumatic valve means that selectively intercept the flow of gas that can flow out of the bottle (during use) or that can flow into the bottle (during filling). The pneumatic valve means are conventionally arranged in an end area of the bottle and are configured to be connected in a sealed manner with respect to an appliance to be supplied with the gas under pressure contained in the bottle, or respectively with an appliance that dispenses gas under pressure to fill the bottle. The amount of gas contained in a bottle is limited by the capacity of said bottle.

Several bottles containing a gas under pressure can be used jointly to dispense a constant and continuous flow of gas, which cannot be obtained with the use of only one bottle. For this purpose, the plurality of bottles to be used jointly is conventionally combined in a metal cage containing structure, in which the bottles are arranged in juxtaposition to each other on vertical axes, or on horizontal axes, forming a so-called “bottle pack”, and are pneumatically connected by means of a sealed pneumatic circuit connecting the pneumatic valve means of all the bottles to each other in series and to a pneumatic connector provided for the connection of a flexible hose, which produces the pneumatic and mechanical connection with respect to an appliance that uses the gas of the bottle pack.

The metal cage structure comprises, in the lower part, a solid internal pallet, on which the bottles of the “bottle pack” rest and provided with a plurality of support feet with respect to the ground.

In the lower part of the bottle pack, the pallet and adjacent pairs of support feet of the pallet form between them, and with the ground, respective slots, having a height sufficient to allow passage of the forks of a fork lift truck for movement of the bottle pack.

Moreover, the pneumatic connector for connecting the hose for connection with respect to an external appliance is arranged at a higher level than the support pallet of the bottles.

Bottle packs of the type specified are periodically moved, for example, from the place in which the gas contained in the respective bottles is used to a plant for filling said bottles with gas, and vice versa. During movement of a bottle pack there is the danger of this pack being moved, by means of a fork lift truck, while the respective hose is still mechanically and pneumatically connected, with respect to an appliance that uses the gas of the bottle pack, or with respect to an appliance that carries out filling with gas of the bottles. This fact, caused by a human error, determines tearing of the hose, resulting in the undesirable violent escape of high pressure gas, often inert/asphyxiating and often combustive, but also flammable and, more rarely, toxic, and possible overturning of the bottle pack with respect to the forks of the fork lift truck moving it.

The documents EP 2 639 490 A2 and US 2018/017215 A1 disclose a safety apparatus for the movement of a plurality of pneumatically interconnected gas bottles, which comprises the features of the pre-characterising part of claim 1.

An object of the present invention is to provide a safety apparatus for the movement of a plurality of pneumatically interconnected gas bottles under pressure, the so-called “bottle pack”, which allow movement of the bottle pack to be prevented in a simple and safe manner, when the respective hose is still connected with respect to an appliance that uses the gas of the bottle pack or with respect to an appliance that carries out filling with gas of the bottles.

Another object of the present invention is to provide a safety apparatus for the movement of a plurality of pneumatically interconnected gas bottles under pressure, the so-called “bottle pack”, which allows the respective hose to be connected with respect to an appliance that uses the gas, or with respect to an appliance that carries out filling with gas of the bottles of the bottle pack in a simple and safe manner only when said pack cannot be moved by means of a fork lift truck.

Another object of the present invention is to provide a safety apparatus for the movement of a plurality of pneumatically interconnected gas bottles under pressure, the so-called “bottle pack”, which has a simple and reliable structure and a relatively low cost.

In view of these objects, the present invention provides a safety apparatus for the movement of a plurality of pneumatically interconnected gas bottles under pressure, the so-called “bottle pack”, the essential features of which form the subject matter of claim 1.

In particular, the present invention provides a safety apparatus for the movement of a plurality of pneumatically interconnected gas bottles under pressure, the so-called “bottle pack”, comprising:

an internal support structure, comprising a plurality of horizontal plates, superimposed vertically, respectively at different levels with respect to the ground, and stably connected to each other;

wherein said support structure supports a plurality of bottles, which contain a pressurised gas and are arranged in juxtaposition to each other on vertical axes, or on horizontal axes, wherein each bottle in said plurality of bottles comprises respective pneumatic valve means to intercept the flow of gas, provided in the upper part thereof, wherein a first plate, lower and close to the ground, is configured as a support pallet for said plurality of bottles and is raised above the ground by means of support feet, wherein at least said first plate forms with at least one pair of said support feet and with the ground at least one slot, having a height sufficient to allow passage of the forks of a fork lift truck for movement of the apparatus;

wherein said pneumatic valve means of each bottle of said plurality of bottles are pneumatically connected by means of a sealed pneumatic circuit connecting the pneumatic valve means of all the bottles, to each other and to a pneumatic connector provided for removable connection of a flexible hose, which creates the pneumatic and mechanical connection with respect to an external appliance that uses the gas, or respectively carries out filling with gas, of said plurality of bottles;

an external cage structure, including a plurality of vertical uprights, arranged around said horizontal plates of said support structure and rigidly connected with respect to said support structure; characterised in that said apparatus comprises:

a vertical interspace, provided between said internal support structure and said external cage structure;

screening means, vertically mobile within said interspace and configured like a blind, that:

in a first lowered working position, closes said at least one slot between said first plate, said at least one pair of support feet and the ground, while it does not screen from the outside said connector of said pneumatic connection circuit and it is possible for an operator to make the removable connection between said hose and said pneumatic connector, and in a second raised working position, screens from the outside said pneumatic connector of said pneumatic connection circuit and prevents an operator from making the removable connection between said hose and said pneumatic connector, while it does not close said at least one slot and it is possible to move the apparatus using a fork lift truck, the forks of which are inserted through said at least one slot, and transfer command means, configured to selectively control the vertical movement of said mobile screening means, respectively into said first lowered working position and into said second raised working position.

Other advantageous features of the present invention are described in the dependent claims.

Further features and advantages of the invention are apparent from the following detailed description of an example of embodiment of the invention with reference to the figures of the drawing, which shows important details for the invention, and from the claims. The features illustrated herein are not necessarily to scale and are represented so that the particular features according to the invention are clearly highlighted. The different features can be implemented individually or in any combination which one another as variants of the invention.

In the accompanying drawing:

FIG. 1 is a front elevation view of the safety apparatus for the movement of a plurality of pneumatically interconnected gas bottles under pressure, the so-called "bottle pack", according to a first example of embodiment of the present invention, wherein said safety apparatus is illustrated in an arrangement that allows an operator to connect the bottle pack with respect to an appliance that uses the gas, or respectively an appliance that carries out filling with gas, of the respective bottles, but not to move said bottle pack;

FIG. 6 is a cross-sectional view along the line VI-VI of FIG. 2;

FIG. 7 is a cross-sectional view along the line VII-VII of FIG. 2;

FIG. 8 is a cross-sectional view along the line VIII-VIII of FIG. 2;

Figure 9:
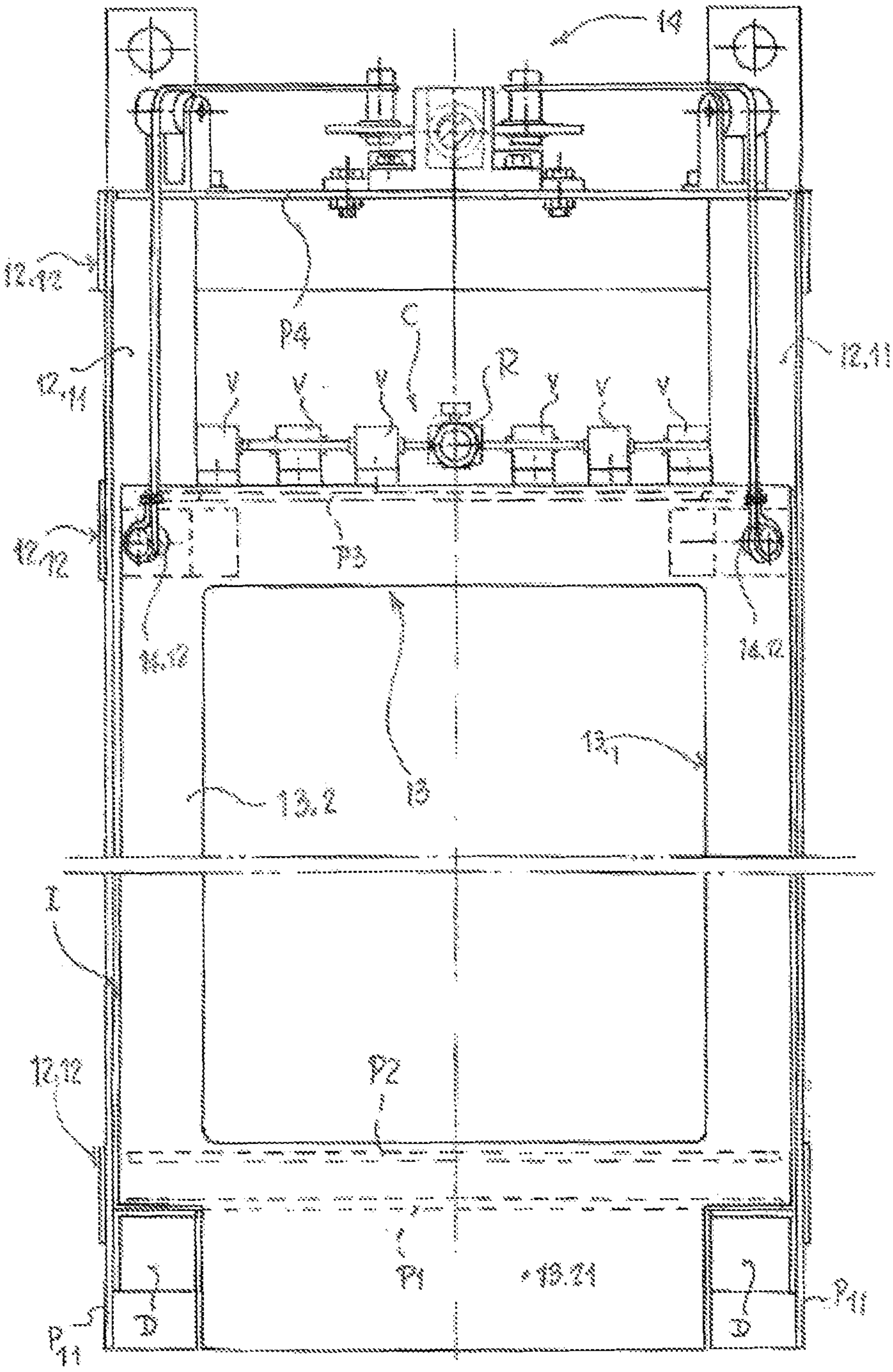
FIG. 9 is a cross-sectional view along the line IX-IX of FIG. 2.
Figure 10:
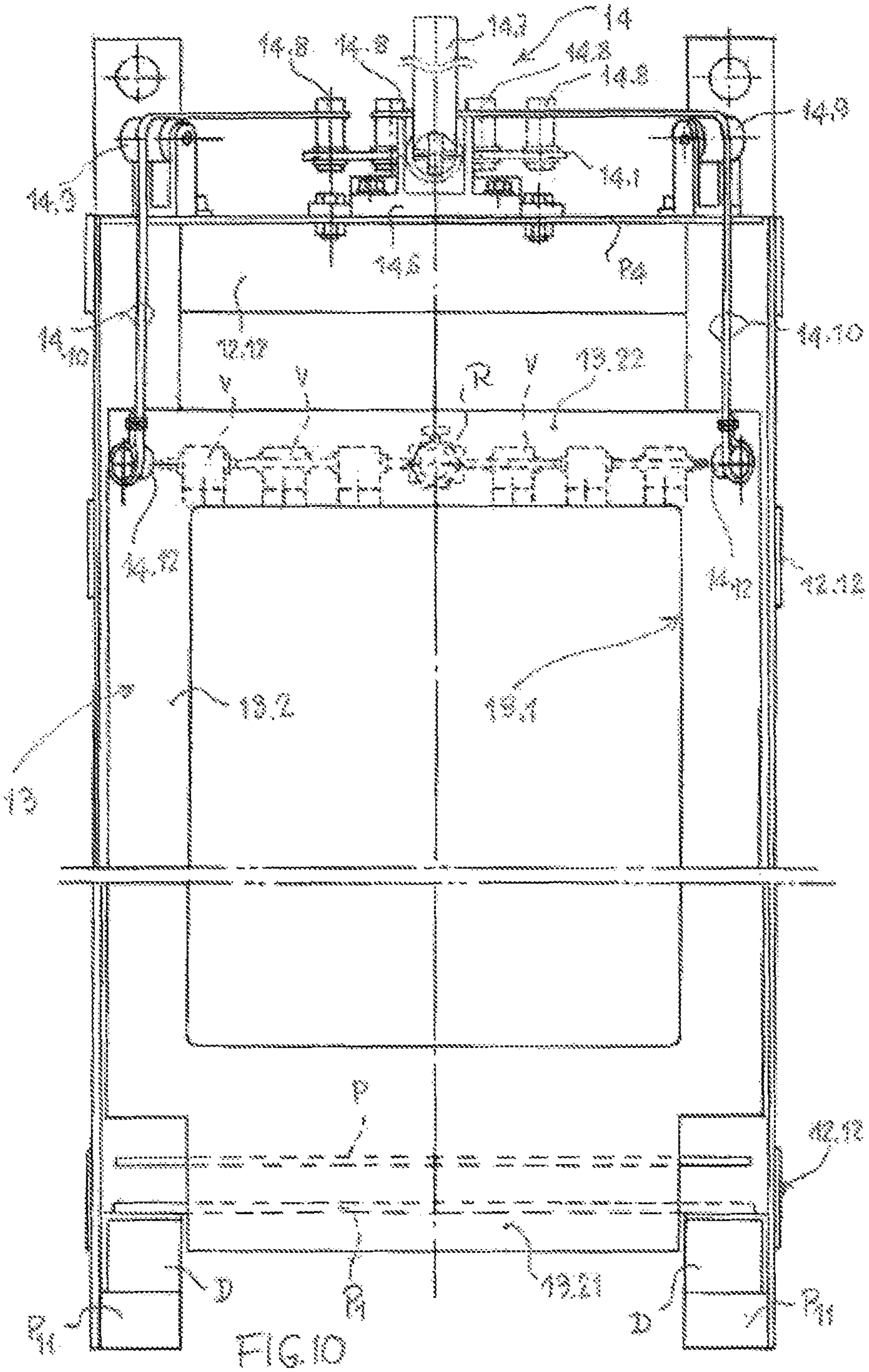
Figure 11:
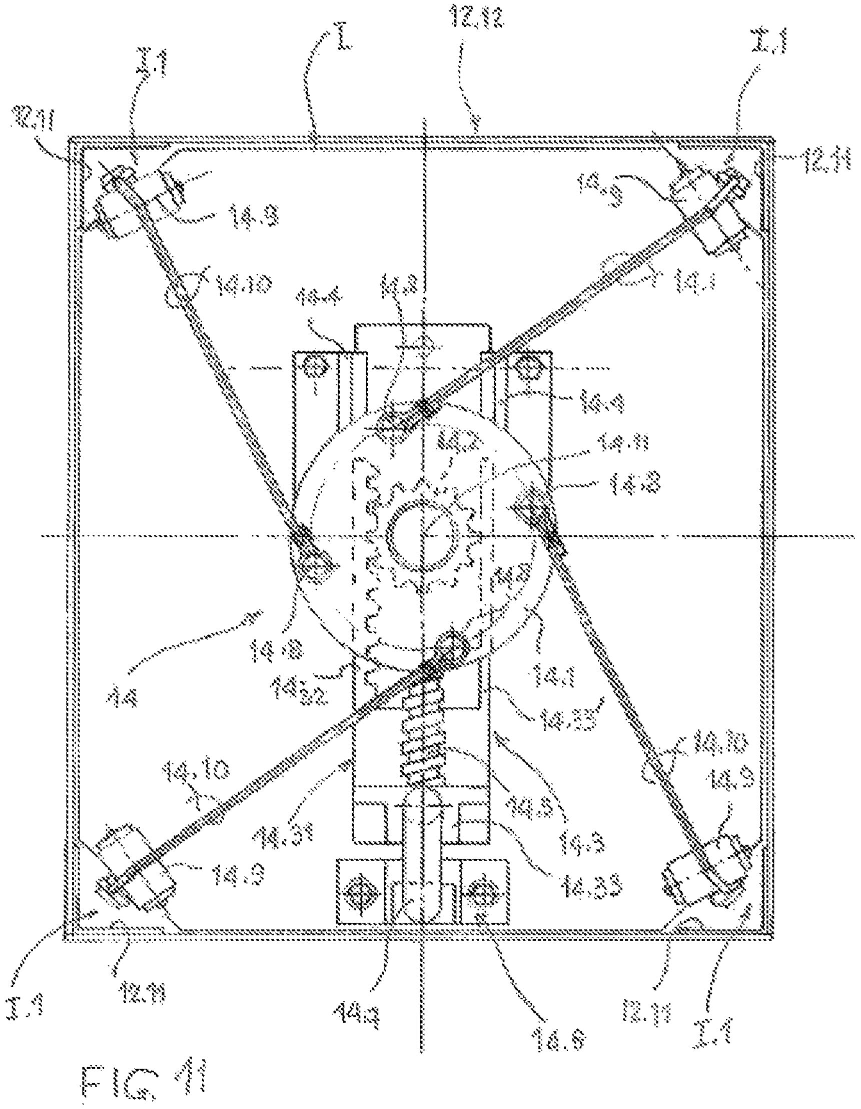
Figure 13:
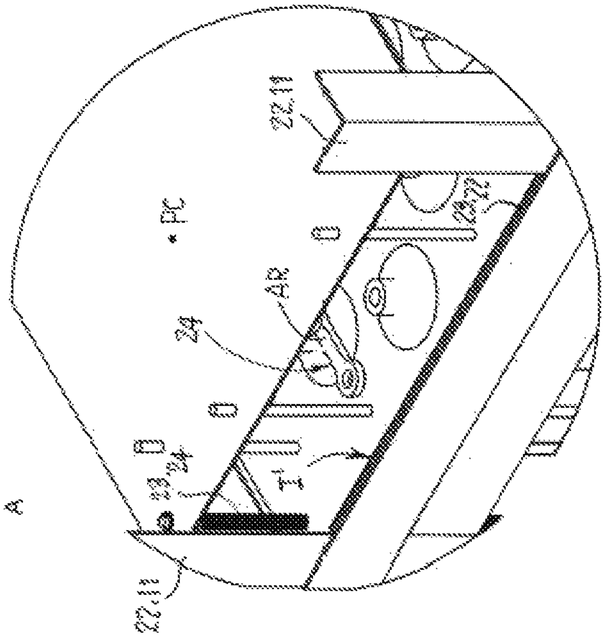
Figure 14:
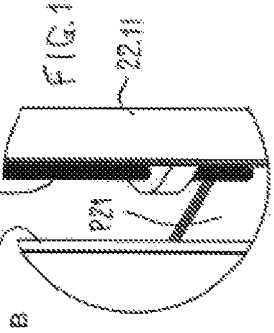
Figure 12:
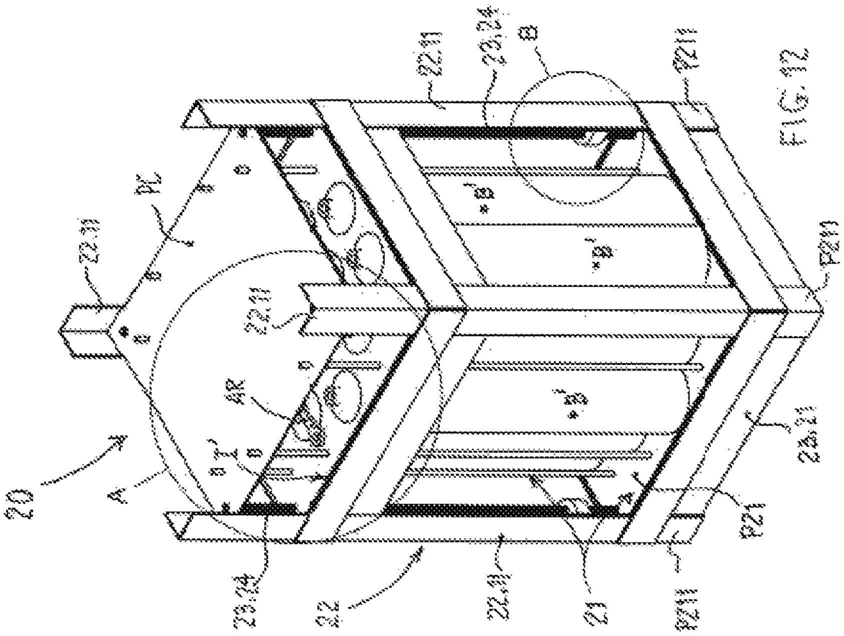
Figures 15, 16, 17:
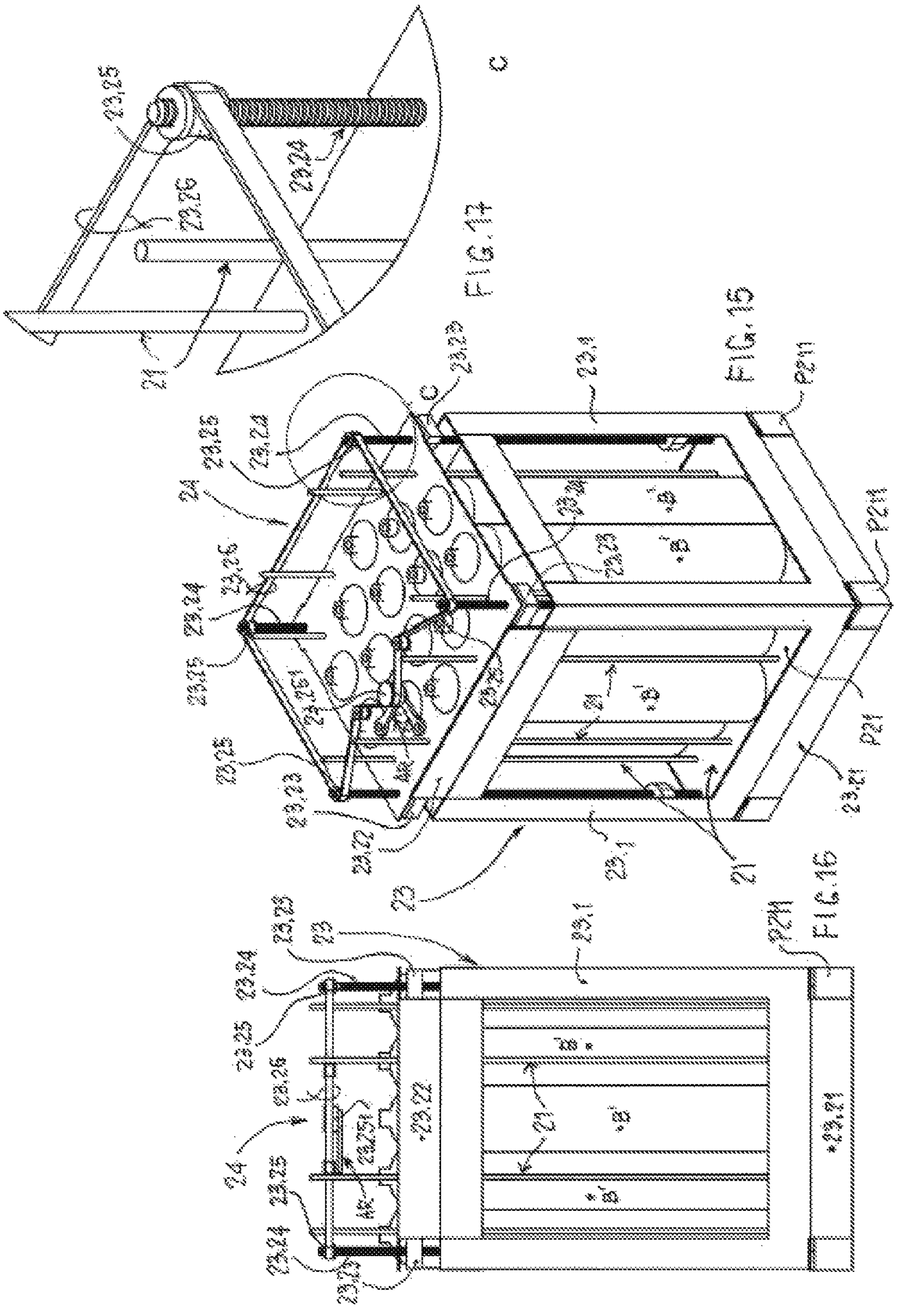

FIG. 10 is a view similar to that of FIG. 9, but in which said safety apparatus is illustrated in the arrangement that allows an operator, after having removed the connection of the hose with respect to an appliance that uses the gas, or respectively an appliance that carries out filling with gas, of the respective bottles, to move the bottle pack, but not to carry out connection of said hose with respect to any appliance;

FIG. 11 is a top plan view of the safety apparatus of FIG. 10;

FIG. 12 is a schematic perspective top view of the safety apparatus for the movement of a plurality of pneumatically interconnected gas bottles under pressure, according to a second example of embodiment of the present invention, in which said safety apparatus is illustrated in an arrangement that allows an operator to connect the bottle pack with respect to an appliance that uses the gas, or respectively an apparatus that carries out filling with gas, of the respective bottles, but not to move said bottle pack;

FIG. 13 is a detail view in an enlarged scale of the detail A of FIG. 12;

FIG. 14 is a detail view in an enlarged scale of the detail B of FIG. 12;

FIG. 15 is a view similar to that of FIG. 12, but wherein an external rigid metal cage structure and a top cover plate are removed for clarity of illustration;

FIG. 16 is an elevation view of the apparatus of FIG. 15;

FIG. 17 is a detail view in an enlarged scale of the detail C of FIG. 15.

FIRST EXAMPLE OF EMBODIMENT (FIGS. 1 to 11)

Figure 1:
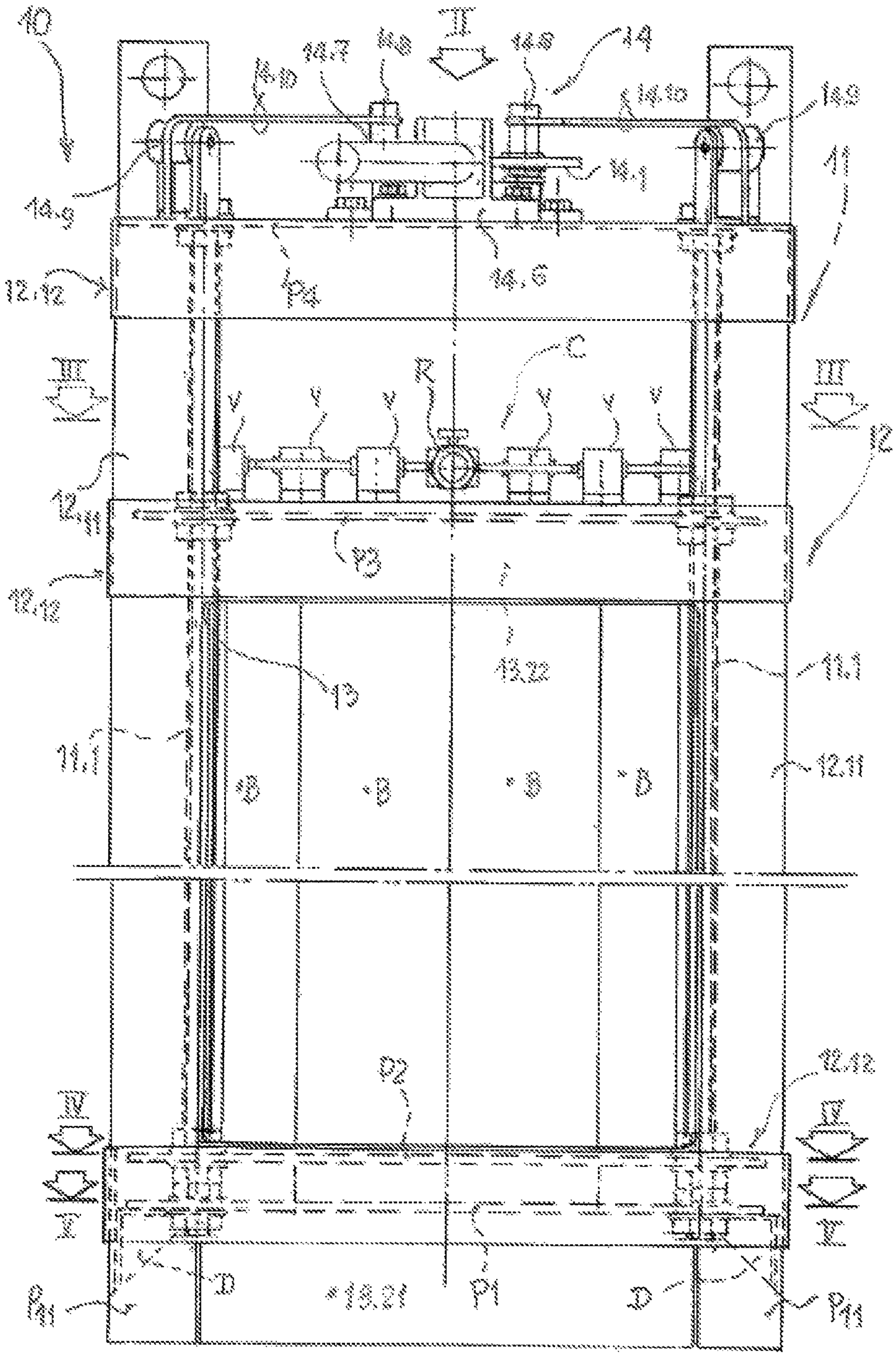

With reference to the drawing, a safety apparatus for the movement of a plurality of pneumatically interconnected gas bottles under pressure, the so-called "bottle pack", according to an example of embodiment of the present invention, is indicated as a whole with 10 (FIG. 1).

Said apparatus 10 comprises:

an internal rigid metal support structure 11, comprising a plurality of horizontal quadrangular metal plates, from P1 to P4, superimposed vertically, respectively at different levels with respect to the ground, and stably connected to each other by means of a plurality of threaded metal columns 11.1, arranged passing through bores in the respective corner areas of said plates;

wherein said support structure 11 supports a plurality of bottles B, which contain a gas under pressure and are, in this example of embodiment, side by side with one another in a vertical arrangement, wherein each bottle B in said plurality of bottles comprises respective pneumatic valve means V to intercept the flow of gas, provided in the upper part thereof, wherein a first plate P1, lower and close to the ground, is configured as sturdy support pallet of the base of the bottles B of said plurality of bottles and is raised above the ground by means of fixed support feet P11 provided in correspondence with its respective corner areas, and wherein said pneumatic valve means V of each bottle B of said plurality of bottles are pneumatically connected by means of a sealed pneumatic circuit C connecting in series the pneumatic valve means V of all the bottles B, to each other and to a pneumatic connector R provided for removable connection of a flexible hose (known per se and not illustrated), which produces the pneumatic and mechanical connection with respect to an external appliance (not illustrated) that uses the gas, or respectively an appliance that carries out filling with gas, of said plurality of bottles B;

an external rigid metal cage structure 12, including four metal profiles configured as vertical uprights 12.11, having an L-shaped cross section, each arranged in front of a respective corner area of said horizontal plates, from P1 to P4, of said support structure 11, and three series of horizontal metal cross members 12.12, welded to the external face of said vertical uprights 12.11 (it can be noted that the support feet P11 of the first plate P1 are formed by the respective lower ends of said uprights 12.11), wherein said series of cross members 12.12 are arranged at different levels with respect to the ground;

wherein the cross members 12.12 of a lower series, close to the ground, form with said first plate P1, with pairs of said adjacent support feet P11 and with the ground, respective slots, having a height sufficient to allow passage of the forks of a fork lift truck for movement of the apparatus 10;

wherein said pneumatic connector R of said pneumatic circuit C is arranged at a higher level than that of said first plate P1;

a vertical interspace I, provided between said internal support structure 11 and said external cage structure 12;

screening means 13, vertically mobile within said interspace I and configured like a blind, that, in a first lowered working position, close said slots between said lower series of cross members 12.12, said first plate P1, said pairs of adjacent support feet P11 and the ground, while it does not screen from the outside said connector R of said pneumatic connection circuit C and it is possible for an operator to make the removable connection between said hose and said pneumatic connector R, and in a second raised working position, screens from the outside said pneumatic connector R of said pneumatic connection circuit C and prevents an operator from making the removable connection between said hose and said pneumatic connector R, while it does not close said slots and it is possible to move the apparatus 10 using a fork lift truck (not illustrated), the forks of which are inserted under the bottle pack through one of said slots, and transfer command means 14, configured to selectively control the vertical movement of said mobile screening means 13, respectively into said first lowered working position and into said second raised working position.

Figure 3:
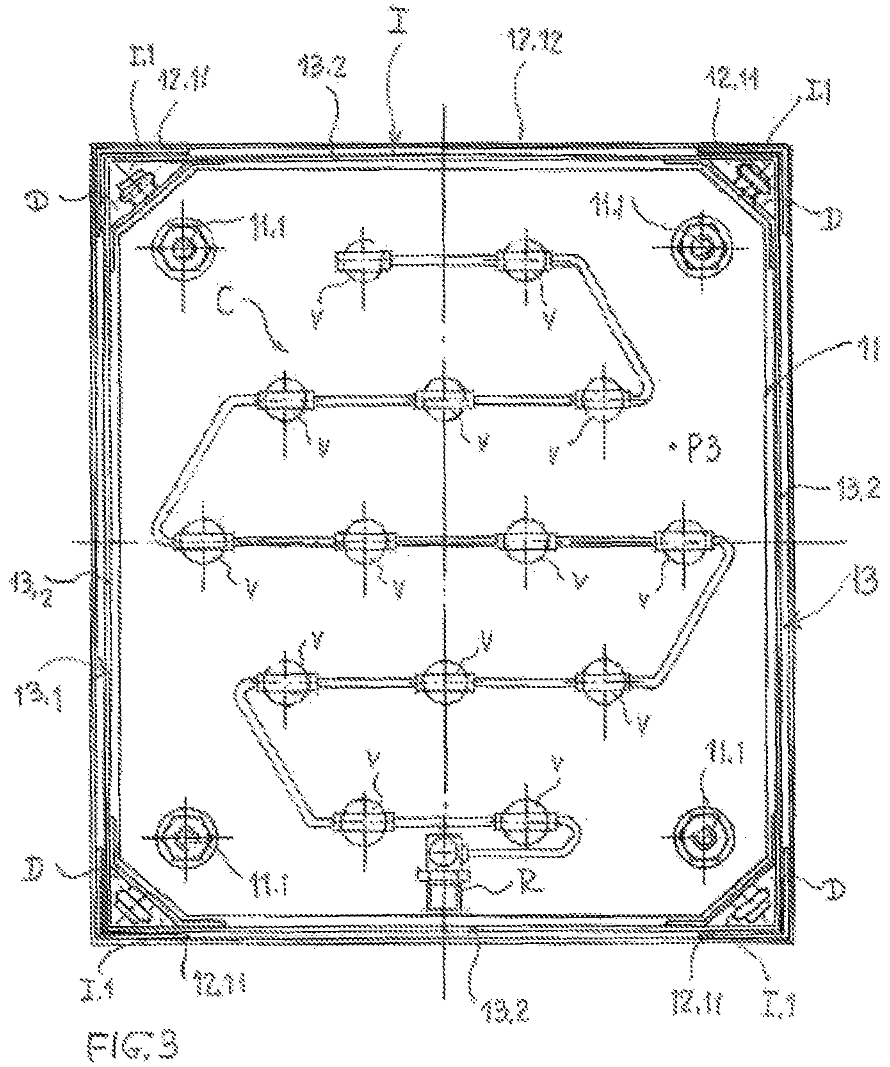
FIG. 3 is a cross-sectional view along the line III-III of FIG. 1.

It can be noted that said sealed pneumatic circuit C and said pneumatic connector R are contained within the footprint of said plates from P1 to P4. In particular, said sealed pneumatic circuit C and said pneumatic connector R are arranged over a third plate P3 (FIG. 3).

Figure 2:
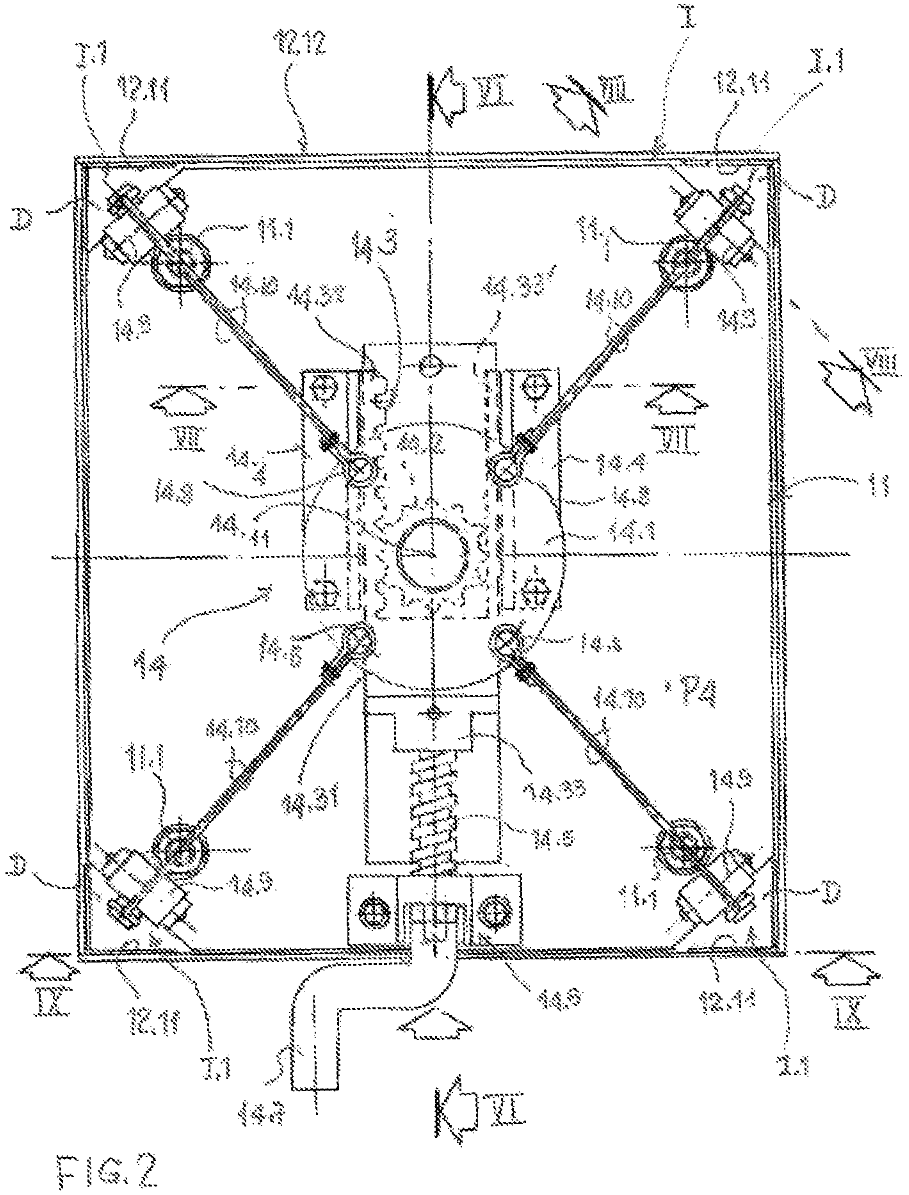
FIG. 2 is a top plan view in the direction of the arrow II of FIG. 1.
Figure 4:
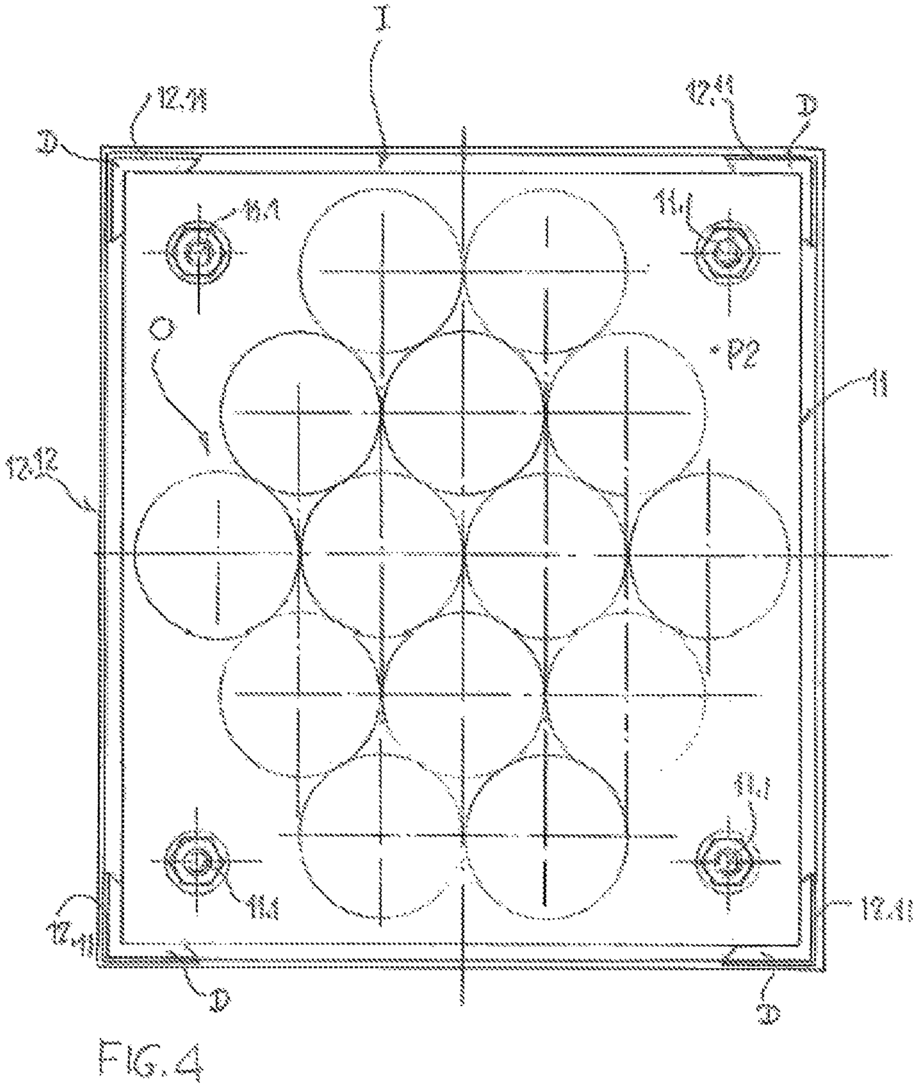
FIG. 4 is a cross-sectional view along the line IV-IV of FIG. 1.
Figure 5:
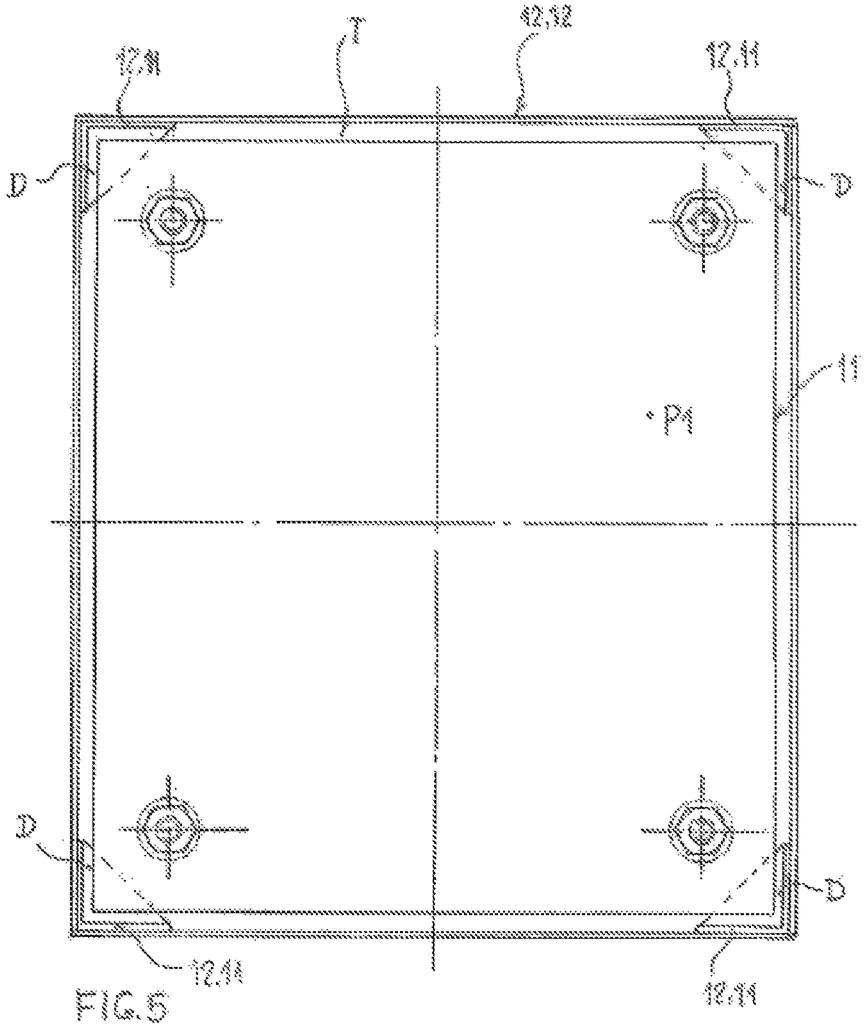
FIG. 5 is a cross-sectional view along the line V-V of FIG. 1.

It can also be noted that said first plate P1 is rigidly connected, in correspondence with its four corner areas, with said vertical uprights 12.11 by means of respective metal spacer elements D, configured to determine a mutual distance between said first plate P1 and said uprights 12.11 corresponding to the width of said interspace I (FIG. 5). The same distance is also maintained between the other horizontal plates, from P2 to P4, and said vertical uprights 12.11 (FIGS. 2, 3, 4).

Moreover, a second plate P2 (FIG. 4) is provided for retaining the bottles of said plurality of bottles B, is superimposed close to said first plate P1 and has an orderly arrangement O of through bores, having a diameter slightly larger than the external diameter of each bottle of the plurality of bottles B, which pass through said orderly arrangement O of bores of the second plate P2 and are retained in an orderly fashion.

Moreover, a third plate P3 and a further plate P4 (FIG. 3, 2) are superimposed at a distance with respect to said second plate P2 for retaining bottles and are aligned vertically with said plates P1 and P2. Said two plates P3, P4 have the respective corner areas bevelled, so as to provide, in correspondence with each vertical upright 12.11, a free passage I.1.

In particular, said third plate P3 is arranged at a level immediately under the pneumatic valve means V, the corresponding pneumatic circuit C and the respective pneumatic connector R of said plurality of bottles B (FIGS. 1, 3). Moreover, said further plate P4 is arranged close to the top of said internal support structure 11, above the pneumatic valve means V, the corresponding pneumatic circuit C and the respective pneumatic connectors V of said plurality of bottles B, and said pneumatic connector R for the flexible hose (FIGS. 1, 2).

Said screening means 13 configured like a blind comprise a box element 13.1 (FIG. 3), for example made of sheet metal, without base and without cover, having four vertical side walls 13.2 and which is housed in said interspace I, between horizontal plates from P1 to P4 and vertical uprights 12.11, in a vertically mobile manner.

In particular, the side walls 13.2 of the box element 13.1 are lightened by means of a large opening and each have:

a first vertical bottom flange 13.21 (FIGS. 1, 9, 10), which in said first lowered working position of said screening means 13, closes a respective slot between said lower series of cross members 12.12, said first plate P1, said pairs of adjacent support feet P11 and the ground, and a second vertical top flange 13.22 (FIG. 10), which in said second raised working position of the said screening means 13, screens from the outside said pneumatic connector R of said pneumatic connection circuit C and prevents an operator from making the removable connection between said hose and said pneumatic connector R.

Said transfer command means 14 comprise (FIGS. 2, 6 to 8 and 11) a rotating body 14.1, with the conformation of a circular disc, mounted above the further plate P4, coaxial and rotating freely with respect to a shaft 14.11 with a vertical axis, which is fixed at the centre of said further plate P4 (in the ideal point of intersection between the geometrical diagonals of said further plate P4). Said rotating body 14.1 carries, inferiorly, a pinion 14.2, rotating integrally therewith, coaxial with respect to said vertical shaft 14.11 and resting on a plate made of low friction material fixed to said further plate P4. Rack means 14.3 are kinematically engaged with said pinion 14.2 and comprise a slider 14.31, resting on said low friction plate and guided by means of a pair of rectilinear guides 14.4 fixed to the upper face of said further plate P4. Said slider 14.31 has the conformation of a fork, wherein a first straight branch 14.32 has an internal rack toothing, engaging with said pinion 14.2, and a second straight branch 14.33, parallel to the first branch 14.32, has a flat internal vertical face arranged in sliding contact with said pinion 14.2. One end of said slider 14.31 has an integral vertical flange 14.33. A lead screw 14.34, configured as threaded nut, is provided integral with respect to said vertical flange 14.33 of said slider 14.31 and has a threaded through bore the axis of which intersects the axis of said shaft 14.11. A corresponding screw 14.5 with a horizontal axis is kinematically coupled with respect to said threaded bore of said lead screw 14.34 with a threaded end part thereof, while the opposite end of said screw 14.5 has a smooth surface and is supported in a freely rotating manner by means of a corresponding bearing fixed with respect to a support 14.6, fixed to the upper face of said further plate P4, close to a perimeter edge of said plate. A manually operated crank 14.7 is connected with respect to said opposite end part of said screw 14.5 and is configured to selective take a first working position, in which it is in an arrangement coaxial to the screw 14.5 and on the outside of said further plate P4 and can rotate integrally with the screw 14.5 around the axis of the screw, and a second working position, rotated through 90° with respect to said first working position, in which it is within the footprint of said further plate P4 and is prevented from rotating.

Moreover, said rotating disc 14.1 supports four vertical fixed pins 14.8, extending upward and arranged symmetrically with respect to the axis of the shaft 14.11 on two vertical planes at right angles to each other passing through said axis.

Furthermore, four idle transfer pulleys 14.9 are provided on the upper face of said further plate P4, each one in correspondence with a respective bevelled corner area of said further plate P4. The axes of two pulleys 14.9 symmetrically opposite to each other with respect to the axis of said shaft 14.11 are at right angles to a respective one of said two vertical planes of symmetry. Four flexible linear elements 14.10 are also provided, each configured as a metal rope. Each linear flexible element 14.10 is fixed, at one end, to a corresponding pin 14.8 of the rotating disc 14.1 and, at the other end, to a corresponding socket 14.12 (FIGS. 9, 10) provided in a respective upper corner area of said box element 13.1 of the screening means 13. By means of said arrangement, said box element 13.1 of the screening means 13 is suspended with respect to said four pins 14.8 integral with the rotating disc 14.1 and is vertically mobile in said interspace I. In particular, said box element 13.1 of the screening means 13 carries out a straight vertical upward movement between said first lowered working position (FIGS. 1, 2) and said second raised working position (FIGS. 11, 10) by means of a rotation of said rotating disc 14.1 around the shaft 14.11 comprised between 60° and 90°, in counter-clockwise direction in FIGS. 2 and 11. Inversely, said box element 13.1 of the screening means 13 carries out a straight vertical downward movement between said second raised working position and said first lowered working position by means of a rotation of said rotating disc 14.1 around the shaft 14.11 comprised between 60° and 90°, in clockwise direction in FIGS. 2 and 11.

As can be understood from the above, the rotation of said rotating disc 14.1 around the shaft 14.11 is controlled by an operator who manually rotates the crank 14.7, arranged in said first working position, and with it the screw 14.5, which commands transfer of the slider 14.31 and of the rack 14.32, which rotates the pinion 14.2 integral with said rotating disc 14.1.

With particular reference to FIG. 6, it can be noted that the lead screw 14.34 is provided with a threaded through bore, radial with respect to the axis of the screw 14.5. A pressure screw 14.341 is engaged in said bore and is manually taken to engage said lock screw of the screw 14.5, with a locking function, when said box element 13.1 of the screening means 13 is arranged in said second raised working position (FIGS. 11, 10).

SECOND EXAMPLE OF EMBODIMENT (FIGS. 12 to 17)

In this second example of embodiment, the safety apparatus for the movement of a plurality of pneumatically interconnected gas bottles B' under pressure, the so-called "bottle pack", is indicated as a whole with 20.

Similarly to the safety apparatus 10 described above, which should be referred to for the parts not described in detail below, said safety apparatus 20 comprises:

an internal support structure 21, comprising a plurality of horizontal plates, superimposed vertically, respectively at different levels with respect to the ground, and stably connected to each other, wherein said support structure 21 supports said plurality of bottles B', which contain a gas under pressure and are arranged in juxtaposition to each other on vertical axes, wherein each bottle B' in said plurality of bottles comprises respective pneumatic valve means to intercept the flow of gas, wherein a first plate P21, lower and close to the ground, is configured as a support pallet for said plurality of bottles B' and is raised above the ground by means of the support feet P211, wherein said pneumatic valve means of each bottle B' of said plurality of bottles are pneumatically connected by means of a sealed pneumatic circuit connecting the pneumatic valve means of all the bottles B', to each other and to a pneumatic connector (not illustrated) provided for removable connection of a flexible hose (not illustrated), which creates the pneumatic and mechanical connection with respect to an external appliance that uses the gas, or respectively carries out filling with gas of the bottles of said plurality of bottles B';

an external cage structure 22, including a plurality of vertical uprights 22.11, arranged around said horizontal plates of said support structure 21 and rigidly connected with respect to said internal support structure 21;

wherein said pneumatic connector of said pneumatic circuit is arranged at a higher level than that of said first plate P21, in particular under a top cover plate PC, fixed in the upper end area of said external cage structure 22 with respect to said uprights 22.11;

wherein at least said first plate P21 forms with at least one pair of said support feet P211 and with the ground at least one slot, having a height sufficient to allow passage of the forks of a fork lift truck for movement of the apparatus 20.

According to the invention, said apparatus 20 comprises:

a vertical interspace I' (FIGS. 12, 13), provided between said internal support structure 21 and said external cage structure 22;

screening means 23, vertically mobile within said interspace I' and configured like a blind, that:

in a first lowered working position, closes said at least one slot between said first plate P21, said at least one pair of support feet P211 and the ground, while it does not screen from the outside said connector of said pneumatic connection circuit and it is possible for an operator to make the removable connection between said pneumatic connector and said hose, and in a second raised working position, screens from the outside said pneumatic connector of said pneumatic connection circuit and prevents an operator from making the removable connection between said pneumatic connector and said hose, while it does not close said at least one slot and it is possible to move the apparatus using a fork lift truck, the forks of which are inserted through said at least one slot, and transfer command means 24, configured to selectively control the vertical movement of said mobile screening means 23, respectively into said first lowered working position and into said second raised working position.

In a similar manner to the first embodiment described above, said screening means 23 configured like a blind comprise a box element, for example made of sheet metal, without base and without cover, having four vertical side walls 23.1 and which is housed in said interspace I', in a vertically mobile manner between said horizontal plates and said vertical uprights 22.11.

In particular, the side walls 23.1 of the box element 23 are lightened by means of a respective large opening and two opposite walls 23.1 each have:

- a first vertical bottom flange, 23.21 that, in said first lowered working position of the said screening means 23, closes a respective slot between said first plate P21, said pairs of adjacent support feet P211 and the ground, and
- a second vertical top flange 23.22 that, in said second raised working position of said screening means 23, screens from the outside said pneumatic connector of said pneumatic connection circuit and prevents an operator from making the removable connection between said hose and said pneumatic connector.

In particular, four threaded nuts 23.23 are fixed, respectively in pairs, with respect to said second integral top flanges 23.22 of two opposite walls 23.1, close to said uprights 22.11. Said four threaded nuts 23.23 are configured as lead screws and are engaged, by means of helical coupling, with four respective threaded rods 23.24 having a vertical axis, stably supported, capable of rotating around the respective axis, between said first plate P21 and said top cover plate PC. In particular, said threaded rods 23.24 can be stably supported, capable of rotating around the respective axis, with respect to said internal support structure 21 and/or with respect said external cage structure 22.

Each vertical threaded rod 23.24 supports, in the top part and under the cover plate PC, a respective driven toothed wheel 23.25, fixed coaxially. The four driven toothed wheels 23.25 have the same toothing and lie in a same horizontal plane under said cover plate PC. A toothed belt 23.26 is configured to run between said driven toothed wheels 23.25, when driven by means of a driving toothed wheel 23.251, which is engaged with respect to said toothed belt 23.26 and is supported with respect to said internal support structure 21 and/or with respect to said external cage structure 22, in a freely rotating manner around a vertical axis. In particular, said driving toothed wheel 23.251 is supported with respect to said cover plate PC, in a freely rotating manner around a vertical axis.

Said driving toothed wheel 23.251 is integral with respect to rotation means, which comprise a coaxial head (for example a hexagonal nut), configured for detachable connection with respect to a rigid drive arm AR, arranged in a plane orthogonal to the axis of said driving toothed wheel 23.251 and that, by means of manual rotation around the axis of said driving toothed wheel 23.251, integral with said same toothed wheel 23.251, allows said first lowered working position or said second raised working position of said screening means 23 to be achieved, respectively. It can be noted that in FIG. 15, for explanatory reasons, said arm AR is illustrated in two distinct positions rotated around the axis of said same toothed wheel 23.251.

It can be noted that the amplitude of the rotation angle of said arm AR is chosen so that, rotating said arm by this angular amplitude, said belt 23.26 is made to run correspondingly between said driven toothed wheels 23.25, determining a corresponding vertical movement of the threaded nuts 23.23 along the respective threaded rods 23.24, such as to take one of the flanges 23.21 or 23.22 of two opposite vertical walls 23.1 of the cage 23 into the respective working position, according to the direction of rotation.

Variants of Embodiment

It can be noted that, in a variant, in the case in which the apparatus according to the invention has a single slot for its movement, the screening means can be in the form of a simple plate configured like a blind, provided mobile with respect to said single slot for insertion of the forks of a fork lift truck.

Moreover, the transfer command means can be configured differently with respect to what has been described and illustrated, and may also be provided with electric gearmotor means, in order to perform the function explained above.

Although the description above refers to an example of embodiment in which the bottles of the bottle pack have respective vertical axes, the present invention can also be implemented, as will be apparent to the person skilled in the art, in the case of a bottle pack in which the bottles are arranged with respective horizontal axes.

In fact, as can be seen from the above, it is sufficient for the pneumatic connector of the pneumatic connection circuit of the bottles to be arranged at a higher level than that of the pallet on which the bottles of the bottle pack rest.

As can be seen from the above, with the present invention it is possible to achieve, in a simple, safe and effective manner, the objects set out in the introduction to the present description.

The invention claimed is:

1. Safety apparatus (10, 20) for the movement of a plurality of pneumatically interconnected gas bottles (B, B') under pressure, comprising:

- the plurality of pneumatically interconnected gas bottles,
- an internal support structure (11, 21), comprising a plurality of horizontal plates (P1, P21; P2, P3, P4), superimposed vertically, respectively at different levels with respect to the ground, and stably connected to each other,
- wherein a support structure (11, 21) supports said plurality of bottles (B, B'), which contain a pressurised gas and are arranged in juxtaposition to each other on vertical axes, or on horizontal axes,
- wherein each bottle (B, B') in said plurality of bottles comprises respective pneumatic valve means (V) to intercept the flow of gas,
- wherein a first plate (P1, P21), lower and close to the ground, is configured as a support pallet for said plurality of bottles (B, B') and is raised above the ground by means of support feet (P11, P211),
- wherein said pneumatic valve means (V) of each bottle (B, B') in said plurality of bottles are pneumatically connected by means of a sealed pneumatic circuit (C) of the safety apparatus for connecting the pneumatic valve means (V) of all the bottles (B, B'), to each other and to a pneumatic connector (R) of the safety apparatus provided for removable connection of a flexible hose, which creates the pneumatic and mechanical connection with respect to an external appliance for using the gas, or respectively for carrying out filling with gas, of the bottles in said plurality of bottles (B; B');
- wherein said pneumatic connector (R) of said pneumatic circuit (C) is arranged at a higher level than that of said first plate (P1, P21), wherein at least said first plate (P1, P21) forms with at least one pair of said support feet (P11, P211) and with the ground at least a slot, having a height sufficient to allow passage of the forks of a fork lift truck for movement of the apparatus (10, 20);

an external cage structure (12, 22), including a plurality of vertical uprights (12.11, 22.11), arranged around said horizontal plates (P1, P21; P2, P3, P4) of said support structure (11, 21) and rigidly connected with respect to said support structure (11, 21);

characterised in that said apparatus (10, 20) comprises;

a vertical interspace (I, I'), provided between said internal support structure (11, 21) and said external cage structure (12, 22);

screening means (13, 23), vertically mobile within said interspace (I, I') and configured as a blind, that:

in a first lowered working position, closes said at least one slot between said first plate (P1, P21), said at least a pair of support feet (P11, P211) and the ground, while it does not screen from the outside said connector (R) of said pneumatic connection circuit (C) and it is possible for an operator to make the removable connection between said pneumatic connector (R) and said hose, and in a second raised working position, screens from the outside said pneumatic connector (R) of said pneumatic connection circuit (C) and prevents an operator from making the removable connection between said pneumatic connector (R) and said hose, while it does not close said at least one slot and it is possible to move the apparatus (10, 20) using a fork lift truck, the forks of which are insertable through said at least one slot, and transfer command means (14, 24), configured to selectively control the vertical movement of a mobile screening means (13, 23), respectively into said first lowered working position and into said second raised working position.

2. Safety apparatus (10) according to claim 1, characterised in that said first plate (P1) is rigidly connected to said vertical uprights (12.11) by means of respective spacer elements (D), configured to determine a mutual distance between said first plate (P1) and said uprights (12.11) corresponding to at least the width of said interspace (I), the same distance also being maintained between the other horizontal plates (P2, P3, P4) and said vertical uprights (12.11).

3. Safety apparatus (10, 20) according to claim 1, characterised in that said screening means (13, 23) configured like as a blind comprise at least one vertical wall (13.2, 23.1) having:

a first vertical bottom flange (13.21, 23.21), which in said first lowered working position of said screening means (13, 23) closes said at least one slot provided at least between said first plate (P1, P21), said at least one pair of support feet (P11, P211) and the ground, and a second vertical top flange (13.22, 23.22), which in said second raised working position of said screening means (13, 23) screens from the outside said pneumatic connector (R) of said pneumatic connection circuit (C) and prevents an operator from making the removable connection between said pneumatic connector (R) and said hose.

4. Safety apparatus (10, 20) according to claim 1, characterised in that the horizontal plates of said plurality of horizontal plates (P1, P2, P3, P4) are quadrangular and said screening means (13, 23) configured as a blind comprise a box element (13.1), without base and without cover, having four vertical side walls (13.2, 23.1) and which is housed in said interspace (I, I'), between said plurality of horizontal plates (P1, P2, P3, P4) and said vertical uprights (12.11, 22.11), in a vertically mobile manner.

5. Safety apparatus (10) according to claim 1, wherein a further horizontal plate (P4) of said plurality of plates (P1, P2, P3, P4) is arranged at a higher level than said first plate (P1), characterised in that said transfer command means (14) comprise:

a rotating body (14.1), mounted coaxially and rotating freely with respect to a shaft (14.11) with a vertical axis, fixed with respect to said further plate (P4), a pinion (14.2), coaxial with respect to said vertical shaft (14.11) and rotating integrally with said rotating body (14.1), rack means (14.3) kinematically engaged with said pinion (14.2), screw (14.5) and lead screw (14.34) drive means configured to command transfer of said rack means (14.3) in opposite directions, rotation command means (14.7) configured to determine the rotation in opposite directions of said screw means (14.5), a plurality of sockets (14.8) that are fixed with respect to said rotating body (14.1), a plurality of flexible elements (14.10), each one fixed, at one end, to a corresponding socket in said plurality of sockets (14.8) and, at the other end, to a corresponding socket (14.12) in said screening means (13), so that said screening means (13) are suspended with respect to said plurality of sockets (14.8) fixed to said rotating body (14.1), are vertically mobile in said interspace (I) and are led to carry out a straight vertical upward movement between said first lowered working position and said second raised working position by means of rotation of said rotating body (14.1) around the shaft (14.11) in a first rotation direction, while said screening means (13) are led to carry out a straight vertical downward movement between said second raised working position and said first lowered working position by means of rotation of said rotating body (14.1) around the shaft (14.11) in a second rotation direction opposite to said first rotation direction.

6. Safety apparatus (10) according to claim 5, characterised in that said rotation of said rotating body (14.1) around said shaft (14.11) is comprised between −30° and −90° or, −30° and +90°, or +30° and −90° or, +30° and +90°.

7. Safety apparatus (10) according to claim 5, characterised in that said rack means (14.3) are configured as a slider (14.31) that slides with respect to said further plate (P4) and has the conformation of a fork, wherein:

a first straight branch (14.32) has an internal rack toothing, engaging with said pinion (14.2), and a second straight branch (14.33), parallel to said first branch (14.32), has a flat internal vertical face arranged in sliding contact with said pinion (14.2), one end of said slider (14.31) has an integral vertical flange (14.33), a lead screw (14.34) is provided integral with respect to said vertical flange (14.33) of said slider (14.31) and having a threaded through bore the axis of which intersects the axis of said shaft (14.11), a corresponding screw (14.5) with a horizontal axis is kinematically coupled with respect to said threaded bore of said lead screw (14.34) with a threaded end part thereof, while the opposite end of said screw (14.5) is supported in a freely rotating manner by means of a corresponding bearing fixed with respect to a support (14.6), fixed to the upper face of said further plate (P4), a crank (14.7) is connected, operationally in a coaxial arrangement, with respect to said opposite end part of said screw (14.5).

8. Safety apparatus (10) according to claim 5, wherein at least said further plate (P4) of said plurality of plates (P1, P2, P3, P4) is quadrangular, characterised in that:

the axis of said shaft (14.11) of said rotating body (14.1) is arranged in a central area of said further plate (P4);

said rotating body (14.1) supports four fixed pins (14.8), configured as sockets, arranged symmetrically with respect to the axis of the shaft (14.11) on two vertical planes at right angles to each other passing through said axis, four idle transfer pulleys (14.9) are provided on one face of said further plate (P4), each one in correspondence with a respective corner area of said further plate (P4), the axes of two pulleys (14.9) symmetrically opposite to each other with respect to the axis of said shaft (14.11) are at right angles to a respective one of said two vertical planes of symmetry, each flexible element of said plurality of flexible elements (14.10) is fixed between a respective one of said vertical pins (14.8) and a corresponding socket (14.12) of said screening means (13) and is transferred by means of a respective transfer pulley (14.10).

9. Safety apparatus (20) according to claim 1, characterised in that said transfer command means (24) comprise means configured as lead screws (23.23), fixed with respect to said screening means (23) and engaged, by means of helical coupling, with respective threaded rods (23.24) with a vertical axis, stably supported, capable of rotating around the respective axis, with respect to said internal support structure (21) and/or with respect to said external cage structure (22).

10. Safety apparatus (20) according to claim 9, characterised in that each vertical threaded rod (23.24) supports a respective driven toothed wheel (23.25), fixed coaxially, and in that a toothed belt (23.26) is configured to run between said driven toothed wheels (23.25), when driven by means of a driving toothed wheel (23.251), which is engaged with respect to said toothed belt (23.26) and is supported with respect to said internal support structure (21) and/or with respect to said external cage structure (22), in a freely rotating manner around a vertical axis.

11. Safety apparatus (20) according to claim 10, characterised in that said driving toothed wheel (23.251) is connected with respect to at least one rigid drive arm (AR), arranged in a plane orthogonal to the axis of said driving toothed wheel (23.251) and that, by means of manual rotation around the axis of said driving toothed wheel (23.251), integrally with said same toothed wheel (23.251), allows said first lowered working position or said second raised working position of said screening means (23) to be achieved, respectively.

* * * * *